United States Patent [19]

Parker et al.

[11] 3,997,215
[45] Dec. 14, 1976

[54] GRAVITY BED TRAILER

[75] Inventors: Shirley L. Parker, Warsaw; John D. Rohrer, North Manchester, both of Ind.

[73] Assignee: Parker Industries, Inc., Silver Lake, Ind.

[22] Filed: Mar. 13, 1975

[21] Appl. No.: 557,944

[52] U.S. Cl. ................................................ 298/24
[51] Int. Cl.² ......................................... B60P 1/36
[58] Field of Search ........................ 298/24, 27–37, 298/22 AE; 296/28 D

[56] References Cited
UNITED STATES PATENTS

| | | | |
|---|---|---|---|
| 729,266 | 5/1903 | Brenzinger | 298/27 |
| 2,072,787 | 3/1937 | Anderson | 298/24 X |
| 3,554,576 | 1/1971 | Parker | 298/24 X |
| 3,700,283 | 10/1972 | Birsall | 298/24 X |

Primary Examiner—Frank E. Werner
Attorney, Agent, or Firm—Marmaduke A. Hobbs

[57] ABSTRACT

A gravity bed trailer in which side and end walls and a bottom form a bed with an opening in the rear wall, and the bottom slopes at a substantial angle from a point near the upper edge of the front wall to a point adjacent the lower edge of the opening in the rear wall. A frame supports the bed, which in turn is supported on an undercarriage, and the tongue extends forwardly from the frame near the upper part thereof and supports a fifth wheel mount on the forward end. A sliding door movable in a pair of spaced tracks closes the opening, and a means slides the door upwardly and downwardly to open and close the opening.

6 Claims, 5 Drawing Figures

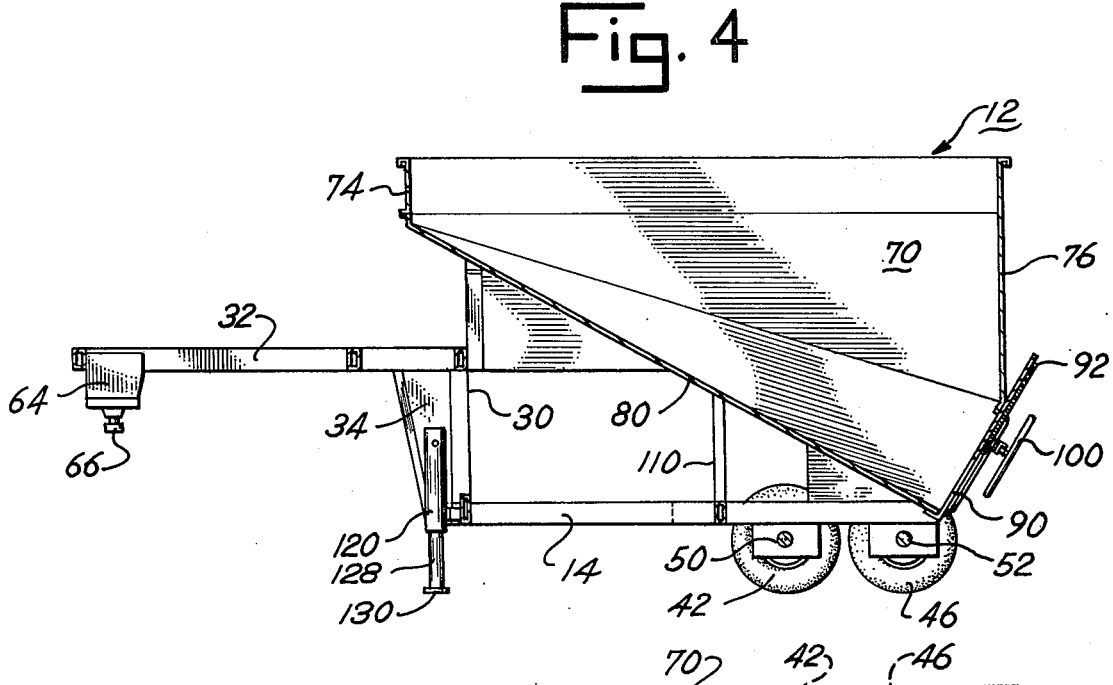
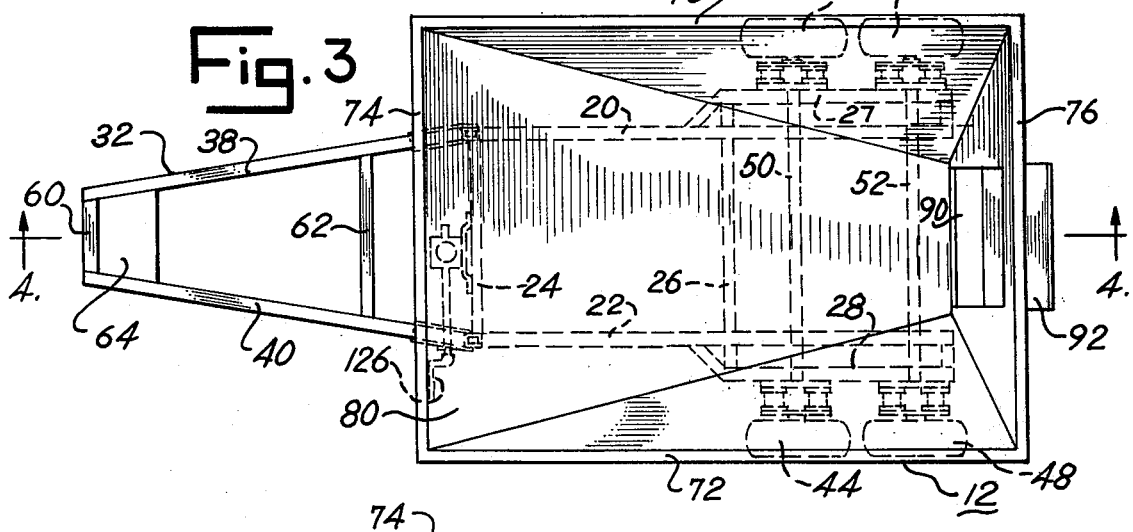
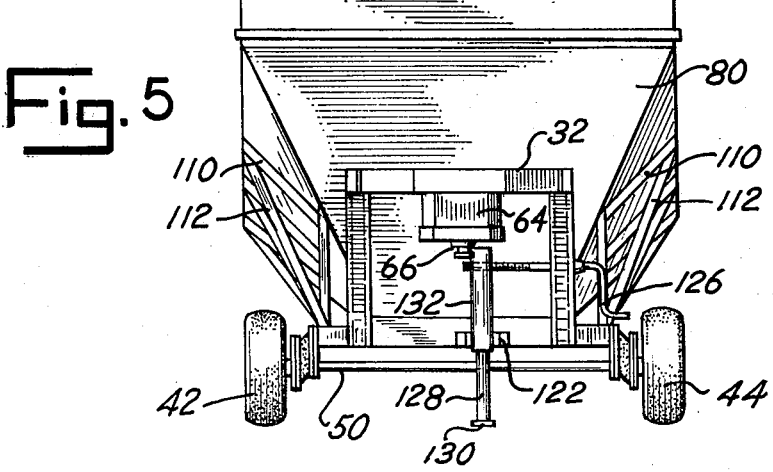

GRAVITY BED TRAILER

Gravity bed wagons and similar vehicles are extensively used in agriculture for hauling grain from the field to the bin or other storage place or to grain elevators or mills. These vehicles are usually of the four wheel type and are frequently difficult to maneuver, particularly backed into places where the loads are to be discharged. Further, the four wheeled vehicles are often unsafe for highways when towed at normal vehicular speeds, and consequently are rarely used to haul the grain to the elevators or mills if the distance is more than several miles from the field. To avoid using the wagons on the highway, the loads are transferred to trucks, thus requiring a separate handling operation of the loads. Single or tandem axle trailers of the gravity bed type have been used, but in the past these vehicles have required a power conveyor system for unloading the grain, or a hydraulically operated system for tilting the bed rearwardly to discharge the grain from the rear of the vehicle. Both of these two types of systems are expensive and require a power connection, either to a PTO, or to hydraulic lines, or both, on the towing vehicle. It is therefore one of the principal objects of the present invention to provide a gravity bed trailer which is so constructed and designed that no mechanical means is required for discharging the load therefrom at the rear of the vehicle and which is highly maneuverable so that it can be easily placed into load receiving and discharging locations.

Another object of the invention is to provide a gravity bed trailer which discharges the load at the rear of the vehicle without moving the bed relative to the frame or undercarriage of the vehicle and without using a power conveyor, and which is simple, strong and compact in construction.

Still another object of the invention is to provide a gravity bed type trailer of the fifth wheel type which permits the trailer to be used safely on the highway at normal vehicular speed, whether the trailer is loaded or empty, and which can be used in and to and from the field, thus eliminating the need to transfer the grain from the trailer to a truck or other vehicle for hauling the grain on the highway.

A further object is to provide a gravity bed trailer of the fifth wheel type which can be used with any standard pick-up truck, and which can handle heavy loads in the field and has good stability and easy handling characteristics on the highway.

Additional objects and advantages of the present invention will become apparent from the following description and accompanying drawings, wherein:

FIG. 3 is a top plan view of the gravity bed trailer shown in FIGS. 1 and 2;

FIG. 4 is a vertical cross sectional view of the trailer, the section being taken on line 4—4 of FIG. 3; and FIG. 5 is a front elevational view of the present gravity bed trailer.

Referring more specifically to the drawings, numeral 10 indicates generally the present gravity bed trailer, having bed 12 mounted on a main frame 14, which in turn is mounted on an undercarriage referred to generally by the numeral 16. The undercarriage shown is of the type disclosed and claimed in our copending application Ser. No. 539,002, filed Jan. 6, 1975. While this type of undercarriage is preferred, other types may be used without departing from the scope of the invention.

Figure 1:
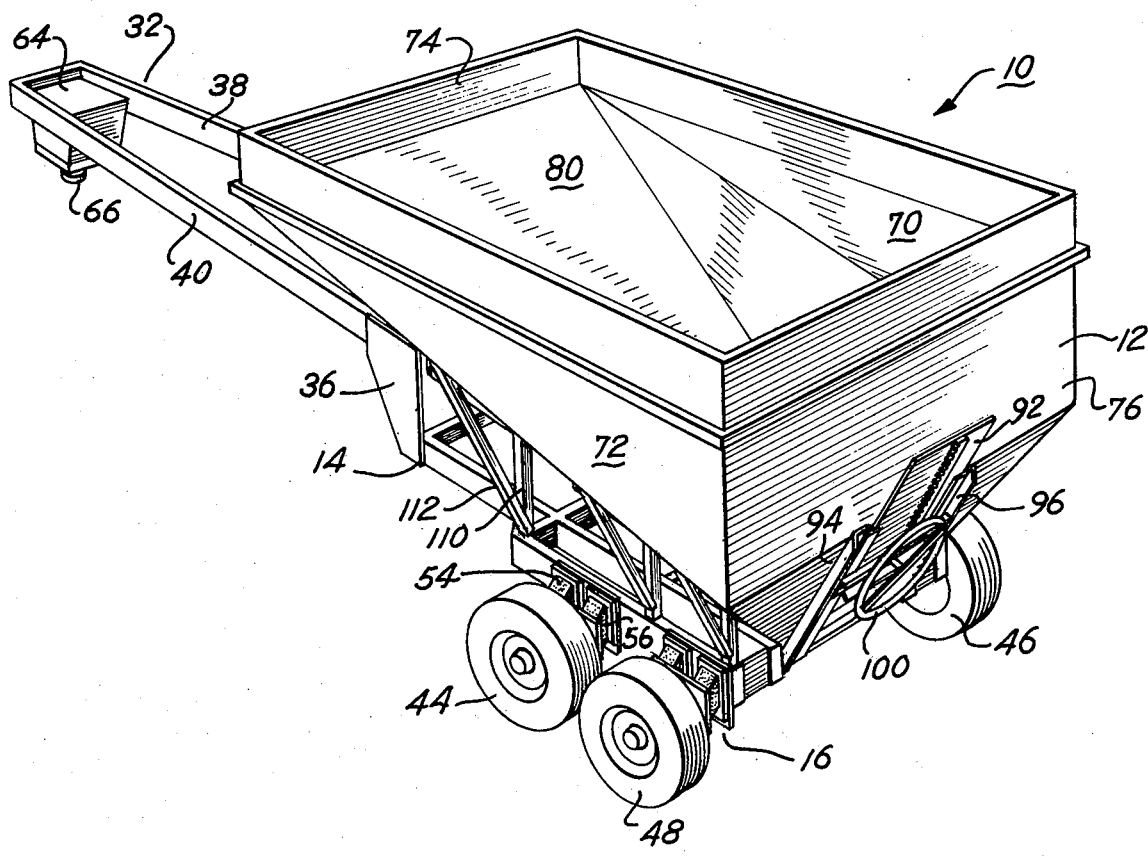
FIG. 1 is a perspective view of a gravity bed trailer embodying the present invention.
Figure 2:
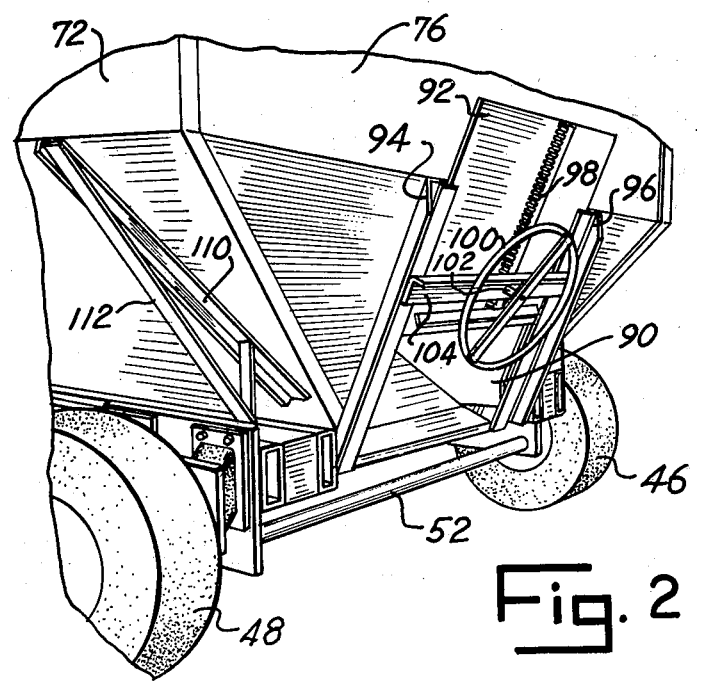
FIG. 2 is a fragmentary perspective view of the gravity bed trailer shown in FIG. 1, showing the discharge door in open position.

The frame consists of longitudinal side members 20 and 22 connected by cross frame members 24 and 26. Shorter longitudinal members 27 and 28 are provided along opposite sides, and are connected at their ends to the longitudinal members 20 and 22 in order to give additional reinforcement to the frame where the greatest weight occurs in the vehicle when it is loaded. The main frame includes an upright frame structure, indicated generally by numeral 30, which supports the forward end of the bed, and a tongue 32 is rigidly connected to and held at generally right angles to the frame structure 30 by metal panels 34 and 36 on the right and left sides, as viewed in FIG. 1, the two panels being welded to frame members 20 and 22 and to members 38 and 40 of tongue 32. Thus, the tongue, upright frame member structure 30, and horizontal frame 14 form a rigid, unitary structure. The undercarriage 16, which supports the frame, includes front wheels 42 and 44 and rear wheels 46 and 48, the two front wheels being journalled on an axle 50 and the two rear wheels being journalled on an axle 52. Each end of the two axles is supported by two resilient units 54 and 56 connected to the axles and to the horizontal frame members 27 and 28. The structural details of the undercarriage are described in the aforementioned co-pending application.

The side members 38 and 40 of the tongue are held rigidly together by cross members 60 and 62, and a part 64 of a fifth wheel mount is rigidly secured to the underside of the forward end of the tongue. The other part of the fifth wheel mount to which connector 66 is attached, is rigidly secured to the bottom of the bed of a pick-up truck, and the tongue extends rearwardly over the tail gate and is normally sufficiently above the sides of the truck bed to permit the trailer and truck to maneuver at various angular positions up to approximately 90°. The fifth wheel mount on the truck is placed forwardly on the rear axle of the truck; thus weight transferred from the trailer to the truck applies a downward force on both the front and rearward wheels of the truck, thereby giving stability to the towing and towed vehicles as the truck tows the trailer.

Bed 12 consists of right and left sides 70 and 72, front end wall 74 and rear end wall 76, the four walls being joined at their vertical corners by welding or other suitable securing means to form a rigid end and side wall structure. A bottom 80 is joined to the lower edge of the four side walls and is disposed at a steep angular slope from the bottom edge of the front wall to the bottom edge of the rear wall, such that any material such as grain will readily slide by gravity toward the rear wall. The rear wall is provided with a discharge opening 90 having a slidable door 92, the two lateral edges of the door being mounted in tracks 94 and 96 so that the door will move upwardly and downwardly to open and close opening 90 at the bottom of the rear end wall. The door is preferably moved by a mechanical means such as a rack and pinion, indicated generally by numeral 98, and a hand wheel 100 for rotating the pinion to move the rack which is attached to the door, and thereby raise and lower the door. The wheel is mounted on a shaft 102 which extends through a cross member 104 connected at its ends to tracks 94 and 96.

The upper portions of the front and rear walls and the two side walls are vertical, and the lower parts of the two side walls 70 and 72 are tapered inwardly and the lower part of rear wall 76 is tapered forwardly. Thus, the bottom of the bed is substantially the full width of the bed at the forward end and is at a reduced width, substantially equal to the width of the opening, at the rear end. Thus, the grain or other material in the bed flows evenly and directly by gravity to opening 90.

The bed is mounted rigidly on frame 14 by welding or other suitable securing means, and is supported laterally by reinforcing members 110 connected to the side walls, and members 112 connected at their upper ends to the side walls and at the lower ends to support frame members 27 and 28. These reinforcing structures are spaced along the sides as required to give the bed the adequate strength, three on each side being illustrated in the drawings.

To support the gravity bed in a level position when the trailer is disconnected from the truck, a stand or jack 120 is provided at the front of frame 14 and is secured rigidly thereto by a bracket 122. The jack is of a screw type of conventional construction and operated by a handle 126. The lower leg 128 and shoe 130 are moved downwardly until the shoe is in position to hold the bed in substantially horizontal position when the towing vehicle is disconnected from the vehicle. When the trailer is to be used, leg 128 is retracted upwardly into the sleeve 132 and in the upper half of the jack and the shoe is held in elevated position.

In the use and operation of the present gravity bed trailer, the trailer is connected to a fifth wheel mount in the bed of the pick-up truck by inserting connector 66 therein. With the trailer connected in this manner, it can be easily towed and maneuvered by the towing truck to any desired position, and with door 92 closed, the bed may be filled with grain or other loose material to be transported. When the load has arrived at its destination, the rear of the trailer is maneuvered into the position where the load is to be discharged, and door 92 is raised by rotating wheel 100, which in turn rotates the pinion on rack 98. As the door opens, the grain flows from opening 90 and the entire load is discharged by the material sliding down the inclined bottom 80 and the two sloping lower portions of sides 70 and 72 and the lower portion of the rear side 76. After the load has been discharged, door 92 can be readily closed again by reversing the rotation of wheel 100, thereby lowering the door. The trailer can be easily towed on a highway, either empty or loaded, and because of the position of the load on the bed and the location of the fifth wheel mount on the truck, the towing and towed vehicles maintain good stability at normal highway speeds. Thus, the present trailer can effectively and efficiently be used, not only for hauling grain from the field to a storage bin on a farm, for example, but also between the farm and the elevator or mill, without having to transfer the load to a truck. Further stability is improved by the rigid, unitary construction of the bed and frame which do not move relative to one another when the load is being discharged; yet the load can be rapidly discharged without the use of a mechanical means such as a conveyor or hydraulic lift which are normally used on trailers of this general type.

While only one embodiment of the present gravity bed trailer has been described in detail herein, various changes and modifications may be made without departing from the scope of the invention.

We claim:

1. A gravity bed trailer comprising a main frame having an upright frame member disposed on the forward end thereof, an undercarriage supporting said frame, a bed fixedly mounted on said frame and connected near its forward end to said upright frame member, said bed having two side walls and a rear wall joined to said side walls at their vertical edges and a bottom joined to the lower edges of said walls and being inclined downwardly from the front to the lower edge of said rear wall, said rear wall having an opening in the lower portion thereof, a door for closing said opening, and a tongue extending forwardly from a point near the upper end of said upright frame member for connection to a towing vehicle.

2. A gravity bed trailer as defined in claim 1 in which a fifth wheel mount is disposed on the forward end of said tongue.

3. A gravity bed trailer as defined in claim 1 in which the lower portions of said side and rear walls taper inwardly and downwardly toward the opening in said rear wall.

4. A gravity bed trailer as defined in claim 1 in which tracks are provided for said door and a means is provided for sliding said door in said tracks for opening and closing the door.

5. A gravity bed as defined in claim 1 in which said undercarriage is the tandem axle type and both axles are spaced forwardly from the bottom of the opening in said rear wall.

6. A gravity bed as defined in claim 1 in which said bed is joined rigidly to said main frame.

* * * * *